(12) United States Patent
Bunch

(10) Patent No.: US 6,795,856 B1
(45) Date of Patent: Sep. 21, 2004

(54) SYSTEM AND METHOD FOR MONITORING THE INTERNET ACCESS OF A COMPUTER

(75) Inventor: Clinton D. Bunch, DeSoto, TX (US)

(73) Assignee: Accountability International, Inc., Dallas, TX (US)

( * ) Notice: Subject to any disclaimer, the term of this patent is extended or adjusted under 35 U.S.C. 154(b) by 460 days.

(21) Appl. No.: 09/605,124

(22) Filed: Jun. 28, 2000

(51) Int. Cl.[7] .......................................... G06F 15/173
(52) U.S. Cl. ................................ 709/224; 709/225
(58) Field of Search ................................ 709/225, 226, 709/229, 217, 219, 203, 224; 713/200, 201, 202

(56) References Cited

U.S. PATENT DOCUMENTS

| | | | |
|---|---|---|---|
| 4,672,572 A | 6/1987 | Alsberg | |
| 5,802,304 A | 9/1998 | Stone | 395/200 |
| 5,961,598 A * | 10/1999 | Sime | 709/224 |
| 5,983,270 A | 11/1999 | Abraham et al. | |
| 5,987,611 A | 11/1999 | Freund | 713/201 |
| 5,991,807 A * | 11/1999 | Schmidt et al. | 709/225 |
| 6,018,619 A | 1/2000 | Allard et al. | 395/200 |
| 6,026,440 A | 2/2000 | Shrader et al. | |
| 6,070,190 A | 5/2000 | Reps et al. | |
| 6,195,697 B1 | 2/2001 | Bowman-Amuah | |
| 6,397,336 B2 * | 5/2002 | Leppek | 713/201 |
| 6,526,341 B1 * | 2/2003 | Bird et al. | 701/35 |

* cited by examiner

*Primary Examiner*—Mehmet B. Geckil
(74) *Attorney, Agent, or Firm*—Scott T. Griggs; Danamraj & Youst, P.C.

(57) ABSTRACT

Employee Internet usage is monitored to identify the web sites employees visit and the amount of time employees spend at each site. The system utilizes a client-based module which monitors Internet access, which operates in conjunction with an enforcement supervisor located on a remote web server. A client-based monitoring module performs all of the monitoring and logging activity. The previous web page title, location (URL) and time spent are stored by the client component in memory on the client computer. The web page title and URL are obtained from system notifications from the browser to the client component. The client computer uploads the log containing the web page information to a web-based supervising module.

43 Claims, 4 Drawing Sheets

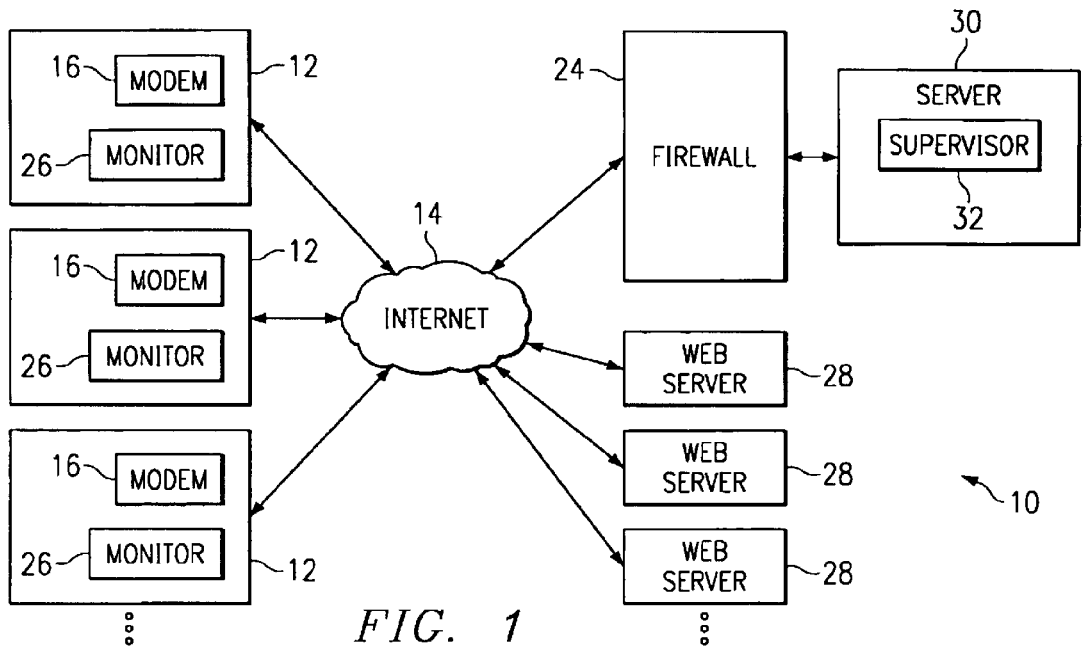
FIG. 1
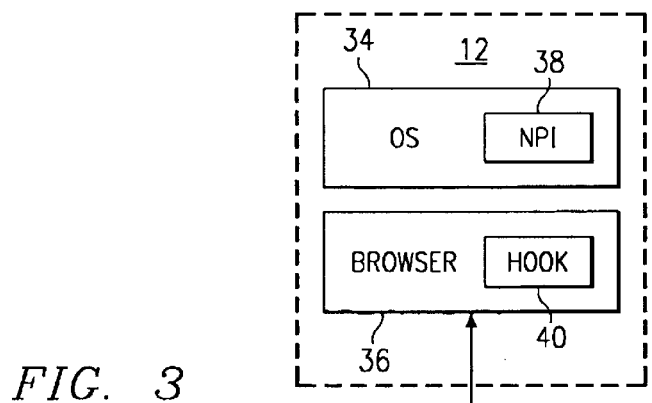
FIG. 3
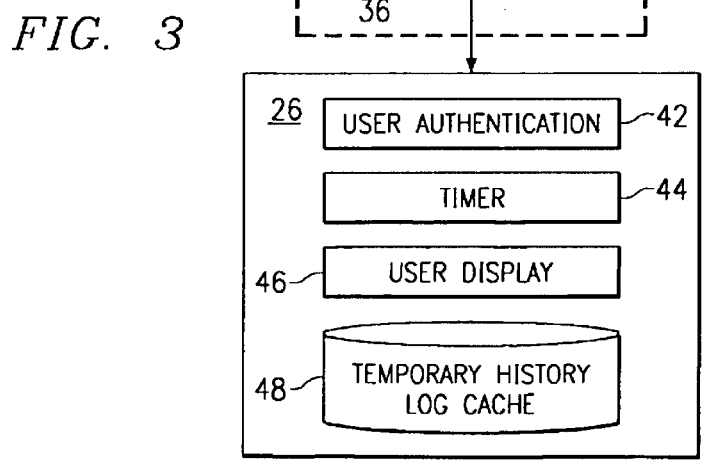

SYSTEM AND METHOD FOR MONITORING THE INTERNET ACCESS OF A COMPUTER

BACKGROUND OF THE INVENTION

The present invention relates generally to information processing, and in particular to systems and methods for monitoring access and usage of individual computer systems and local area networks ("LANS") connected to larger open networks (wide area networks or "WANS"), including the Internet.

The explosive growth of the Internet ("Net"), particularly the World Wide Web ("Web"), has had a dramatic effect on the way many corporations and other organizations do business. The Internet brings a world of information to the fingertips of employees.

However, some of what the Web introduces into the workplace can be non-productive and damaging to a business. Employees who waste company time or resources on non-work-related activities can become a drain on the company. If Internet bandwidth is used for downloading pornography or making personal travel reservations, it could mean slower access for employees doing work. Fellow employees could be exposed to inappropriate material that could ultimately lead to a sexual harassment lawsuit. Just as it is inappropriate to pass around certain materials at work, it is inappropriate for employees to be viewing certain material on company computers, especially if other employees may be unwittingly exposed to that material.

As a result, corporate IS (Information System) departments face new challenges. Companies are increasingly looking for the best way to manage Internet access, and keep objectionable online material out of the workplace. One hundred twenty-two million employees are expected to access the Internet, and 660,000 companies are expected to implement Internet productivity systems in the year 2000.

One extreme solution is to build a company-wide intranet. However, the company's knowledge-base may not include the information an employee needs. Also, as the use of E-mail becomes more accepted and the Internet continues to grow, cutting employees off from the Web does not make good business sense.

The software industry has introduced a number of products and technologies that are designed primarily to monitor and track the web sites visited by users. Most, if not all of these products are based on filtering software.

Filtering software is designed to help companies control recreational and personal Internet use. The software monitors employee use of the Net and, depending on how it is configured by the employer, prevents employees from visiting certain types of Web sites that could interfere with productivity, tie up Internet bandwidth or violate company policies.

Some filtering software contains what the company calls its list of sites that are inappropriate for employees. Blocked sites are divided into categories so that companies can enable access to specific content categories according to the time of day. For example, an employer could permit access to entertainment sites during the lunch hour or after hours.

To that end, software can be used to deny employees access to sites in such areas as astrology and mysticism, games, entertainment, travel, news, job searches, investment, hobbies and more. In other words, anything an employee might want to do that's not directly related to his job.

Access levels can be defined on the basis of time of day or the day of the week. The employer could, for example, give users access to a wider range of web sites after 6 P.M. or on weekends. The employer could also define different levels of Internet access for different individuals or groups in the company.

A human resource department, for example, could have access to job search Web sites that might be off-limits to other employees. The chief executive could have unlimited access and still restrict what others can do.

Filtering software is not without limitations. Much of the software won't run on systems with a modem connection to the Internet. The filtering software requires a server-based mechanism such as a Microsoft or Netscape proxy server or a Check Point Firewall.

While the server-based mechanisms have the advantage of not requiring software to be installed on the client machine, they are incapable of monitoring the actual time spent by the user on any given web page. In addition, LAN server-based mechanisms have the disadvantage of imposing significant performance penalties, especially if the number of clients connected to it is large. This approach usually requires technical expertise since it is difficult to administer and configure.

Filtering software does a good job of blocking out the offensive sites, but the software may inadvertently restrict information that the employee may need. For example, an employee researching breast cancer, or an HR director putting together a presentation on the topic of sexual harassment in the workplace may not be able to obtain the relevant information. Additionally, filtering software requires constant updating due to new web sites with offensive content going on-line daily.

Also, a moderate amount of employee use of the Internet for personal business isn't necessarily counterproductive. Just as most employers tolerate a certain amount of personal phone calls at work, it may be perfectly acceptable for an employee to use a company PC to make personal travel arrangements, book a dinner reservation, check a stock portfolio or read the newspaper during personal break time.

Another software industry solution, client-based filters (e.g. Surfwatch and CyberPatrol) which prevent users from accessing undesirable Web sites, does not adequately overcome the limitations of centralized filtering. Designed largely as parental control tools for individualized PCs, these programs are easily disabled by uninstalling (accidently or intentionally) the filter. For example, a Windows user can simply reinstall the Windows OS, replacing certain driver files of the filter. This disables the filter and provides the user with unrestricted access to the Internet.

A solution has not yet been proposed to deal with the problems posed by Internet access in the corporate environment. There is a need for a simple system and methods providing companies the means to monitor the exchanges permissible between a local computer and an external network or WANS, including the Internet.

BRIEF SUMMARY OF THE INVENTION

Perhaps the two aspects of Internet access most important to the productivity of an organization are 1) the ability to monitor the amount of time employees spend on the Internet and 2) the web sites employees visit while on the Internet. Although the Internet is an increasingly important business tool, it also poses a temptation for abuse. Employees may be tempted to pursue their own private interests while on the job. The Internet access monitoring system of the present invention addresses this problem by allowing an organization to monitor employee Internet access on a time-spent-per-page and total time-per-week basis. The actual monitoring can be done in a variety of ways, including monitoring the time and web site history of an employee actively interacting with the Internet, and/or monitoring the complete time and web site history of particular groups of users accessing the Internet.

The present invention addresses the bandwidth concerns by limiting access to the Internet to certain times of the day and monitoring employees. When an employee knows that he is being monitored, he is much less likely to surf inappropriate material on the Internet.

The present invention provides system and methods for client-based monitoring of Internet access, which operate in conjunction with an enforcement supervisor located on a remote web server. In accordance with the present invention, a central filter and centralized enforcement supervisor are not used. Instead, the present invention provides a client side mechanism for tracking Internet usage on a time-spent-per-web-page basis within a browser such as Microsoft Internet Explorer and transmitting this information to a remote web site (over the Internet or any other network) where authorized personnel can access the information over the Internet.

The client-based monitoring module in a preferred embodiment performs all the monitoring and logging work. Each time the user navigates to a new web page, the previous web page title, location (Universal Resource Locator or URL), and time spent are then stored by the client component in memory on the client computer. The web page title and URL are obtained from system notifications from the browser to the client component. The client computer uploads the log containing the web page information to a web-based supervising module.

The present invention provides guidelines that can include criteria such as total time a user can be connected to the Internet (e.g., per day, week, month or the like), and the time a user can interactively use the Internet (e.g., per day, week, month, or the like). These guidelines can be qualified by optionally specifying: to whom should a rule apply (list of users, list of work groups, or all); time of day when the rule should be applied (for example from 9 a.m. to 5 p.m.).

All the logged information is viewable by an administrator in either a summary format (total number of hours spent by each user) or in a detailed format (time per web page with details such as the web page tile, URL, and time) by visiting the web site and entering the Administrator authentication information. This function is the same as that of a history log except that a web-based format does not permit modification by the client machine.

BRIEF DESCRIPTION OF THE DRAWING

The accompanying drawing is incorporated into and forms a part of the specification to illustrate the preferred embodiments of the present invention. Various advantages and features of the invention will be understood from the following detailed description taken in connection with the appended claims and with reference to the attached drawing figures in which:

FIG. 1 is a block diagram providing an overview of a Internet-based (client/server) system in which the present invention is embodied;

FIG. 3 is a block diagram illustrating a client-side monitor;

DETAILED DESCRIPTION OF THE INVENTION

Figure 2:
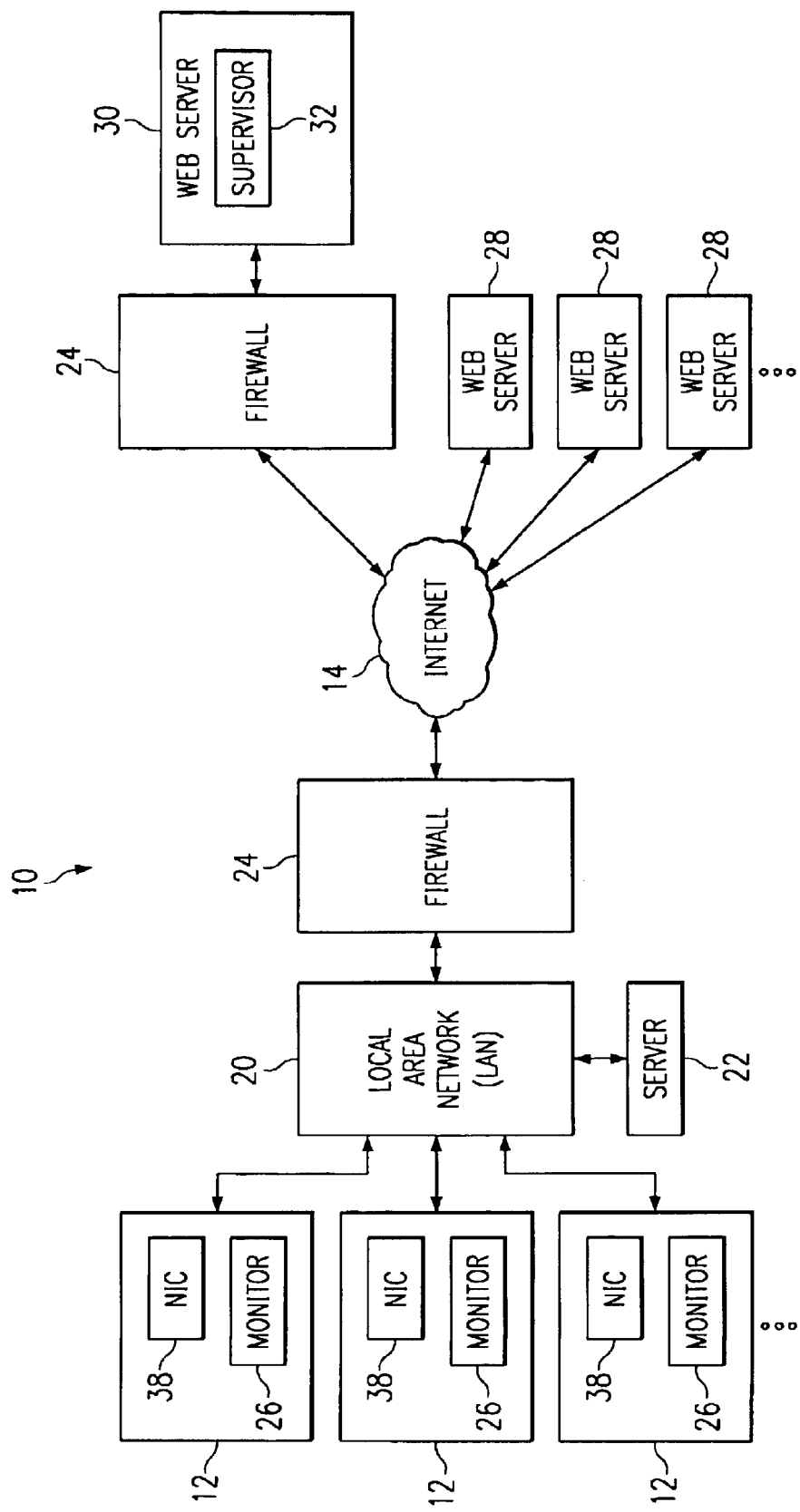
FIG. 2 is a block diagram providing an overview of a Internet-based (client/server) system in which the present invention may be embodied.

Preferred embodiments of the invention will now be described with reference to various examples of how the invention can best be made and used. Like reference numerals are used throughout the description and several views of the drawing to indicate like or corresponding parts.

The present invention provides system and methods for client-based monitoring which operate in conjunction with a web-based enforcement supervisor. In accordance with the present invention, a central filter and centralized enforcement supervisor are not used. Instead, the present invention provides a client side mechanism for tracking Internet usage on a time-spent-per-web-page basis within an Internet browser such as Microsoft Internet Explorer and transmitting this information to a remote web site (over the Internet or any other network) so that it is easily accessed by authorized personnel over the Internet.

An Internet access monitoring system, constructed in accordance with the present invention, preferably supports the maintenance of a detailed log of Internet access, for enforcing the guidelines. An Internet access monitoring system, constructed in accordance with the present invention, preferably supports guidelines. The present invention provides guidelines that can include criteria such as total time a user can be connected to the Internet (e.g., per day, week, month or the like), and the time a user can interactively use the Internet (e.g., per day, week, month, or the like). These guidelines can be qualified by optionally specifying: to whom should a rule apply (list of users, list of work groups, or all), and time of day when the rule should be applied (for example from 9 a.m. to 5 p.m.).

All the logged information is viewable by an administrator in either a summary format (total number of hours spent by each user) or in a detailed format (time per web page with details like the web page tile, URL, and time) by visiting the web site and entering the Administrator authentication information. This function is the same as that of a history log except that a web-based format does not permit modification by the client machine.

The present invention addresses the bandwidth concerns by limiting access to the Internet to certain times of the day and monitoring employees. When an employee knows that he is being monitored, he is much less likely to surf inappropriate material on the Internet.

I. System Hardware

The system hardware of the client-side Internet access monitoring module and server-based Internet access supervisor employed in a preferred embodiment, will now be described in further detail.

Referring to FIG. 1 and FIG. 2, the invention is generally embodied on a computer system 10 including one or more personal computer systems, such as a desk-top personal computer 12. Preferably the personal computer system is an IBM PC-compatible personal computer, available from a variety of vendors (including IBM of Armonk, N.Y., and Compaq Computer Corporation of Houston, Tex.), but the personal computer system 12 could be a wireless telephone with Internet capability or the like. In the alternative, with the growth of remote computerized appliances, the present invention is useful to control television viewing, computer game usage, cell phone usage and the like.

Referring to FIG. 1, the personal computer system 12 is connected to a Wide Area Network ("WAN") 14 by a modem 16. In the preferred embodiment, the WAN is the Internet or World Wide Web ("WWW"). Preferably, the modem 16 is a SDSL or ADSL service (e.g., available from Jump.net of Austin, Tex.), but the modem could be a conventional 56K modem (e.g., available from U.S. Robotics), ISDN line or the like.

Referring to FIG. 2, in an alterative embodiment, the personal computer system 12 is connected to the WAN 14 by a Network Interface Card ("NIC") 18 and a Local Area Network ("LAN") 20 which has a server 22 and a firewall 24.

Referring to FIG. 1 and FIG. 2, the personal computer system 12 includes a client-side Internet access monitoring module 26 of the present invention.

The Internet allows access to a multitude of web servers 28. Of particular interest is a supervisor web server 30 which includes a web-side Internet access monitoring supervisor module 32 of the present invention and a firewall 24. In an alternative embodiment, the web-side Internet access monitoring supervisor module 32 is located on the server 22.

The web site Internet access monitoring supervisor module 32 and client-side Internet access monitoring module or client module 26 prevent users from circumventing Internet monitoring, either accidentally or intentionally. It should be difficult, for instance, for a user to circumvent Internet monitoring by connecting to the Internet through a dial-up connection (e.g., connecting to an ISP with a modem). The monitoring system of the present invention is triggered by the Internet browser, not the Internet connection, making circumvention difficult. Similarly, it should be difficult for a user to circumvent access rules by installing, uninstalling or tampering with components of his own PC or the monitoring system. The minimum number and small size of client-side components of the present invention makes tampering difficult and software conflicts unlikely. Each personal computer system has one client-side module that is less than one megabyte in size.

II. System Software and Operation

Construction and operation of the client-side Internet access monitoring module, including its interaction with server-based components employed in a preferred embodiment, will now be described in further detail.

A. User Session with Respect to the Client-side Monitoring Module

A user session with respect to the client-side monitoring module will now be described in further detail. Referring to FIG. 3, the personal computer system 12 includes the client-side monitoring module 26, an operating system (OS) 34, and an Internet browser 36. The client-based monitoring module 26, which in a preferred embodiment performs all the monitoring and logging work, is responsible for intercepting universal resource link requests between an Internet browser and a network programming interface.

The operating system has the network programming interface component 38 for communications between the Internet browser 36 and the WAN or Internet 14. Preferably, the operating system (OS) is Microsoft Windows 95, 98, 2000, or NT (available from Microsoft Corporation of Redmond, Washington), but the OS 34 could be Linux, Apple OS/9 or another operating system. Microsoft's Windows operating system has a network programming interface component 38 known as Windows sockets for use by application software to communicate on the Internet. The Windows sockets is implemented in the Windows operating system as a dynamic link library named "WSOCK-32.DLL." A prior version for 16-bit software is implemented in a file named "WINSOCK.DLL."

An Internet browser 36 which utilizes the network programming interface 38 for communicating on the Internet generally does not control the computer's connection to the Internet 14, but rather simply calls the Windows sockets to communicate over the Internet 14. Preferably, the Internet browser 36 is Internet Explorer (available from Microsoft Corporation of Redmond, Washington), but the Internet browser could be some other browser such as Netscape Navigator.

Internet Explorer allows certain of its function calls to the network programming interface 38 to be monitored by the software module, including the client-side module, with a hook interface 40. The hook interface 40 is a function exported by the client-based software or other monitoring software module for monitoring requests from Internet Explorer to the network programming interfaces 38. In the computer software field, the term "hook" generally refers to the ability for one application to monitor or receive notification about function calls made by another application to yet a third application, a system component, or an application programming interface. A "hook interface" is a mechanism by which an application registers to receive notification information from a hook.

The client module 26 is programmed to intercept events from Internet Explorer browser 36 by following these steps:

1. Registering itself in the Windows Registry to be loaded upon browser startup;
2. Implementing the IObjectWithSite interface published by Microsoft; and,
3. Implementing the IObjectWithSite::SetSite( ) method. This method allows the application to request a pointer to Internet Explorer's IWebBrowserEvents2 Interface. This interface may be used to intercept events from Internet Explorer.

The following Microsoft links have further technical details, which are incorporated herein by reference:

http://support.microsoft.com/support/kb/articles/Q179/2/30.ASP;

http://msdn.microsoft.com/workshop/browser/webbrowser/reference/IFaces/DWebBrowserEvents2/DWebBrowserEvents2.asp; and, http://support.microsoft.com/support/kb/articles/Q179/2/30.ASP.

Alternatively, the open source version of the Net-scape Navigator browser (e.g., available from www.mozilla.org) can be configured to allow certain of its function calls to the network programming interface 38 to be monitored by a software module, such as the client-side module 26, with the hook interface 40.

Whenever the hook interface 40 hooks a URL request to the network programming interface 38, the hook interface determines that the Internet browser 36 is attempting to communicate over the Internet 14. The hook interface 40 sends the URL request to the client-based monitor and sends the URL request to the network programming interface 38.

A user might attempt to circumvent the system by loading an authorized browser. This invention has the ability to perform a periodic search of the files on the personal computer system or client computer 12 to determine file names associated with other browsers. This is accomplished by comparing a compiled list of file names associated with unauthorized browsers. Violations are reported to a designated administrator via email.

The client-based monitor contains a user authentication application 42, a timer 44, an user display application 46, and a temporary history log cache 48. The user authentication module 42 presents the user with a log-in prompt, accepts the user's name and password and forwards this information to the web-based server.

The timer application 44 synchronizes its internal time to the server time. The current time is maintained by the client component 26 independently of the computer system time in order to prevent users from subverting the system by changing the time clock in the OS 34.

The timer application processes (i) the number of permitted minutes/week, (ii) the number of minutes already consumed this week, (iii) the monitored and restricted start and end times, and (iv) the current system time at the web-based server 30.

Also, the timer application 44 processes the URL requests from the hook interface 40. The timer application 44 logs all the URL requests in the temporary history log cache 48 on a time-spent per page basis. By logging all the times that URL requests are made, the system can create a comprehensive representation of a user's Internet activities.

The timer 44 of the client module 26 is programmed to record time-spent-per-URL by following these steps:

1. Implementing the DwebBrowserEvents2::NavigateComplete2 method to be notified each time a new URL is navigated to;
2. Each time a new notification is received, the URL is stored in memory along with the current time at which it is received. The time spent on the previous URL is the difference between the current time and the time stored corresponding to the previous URL; and,
3. The temporary history log cache 48 will contain the sequence of URL, begin time and time spent records in memory on the client module 26.

If the user exceeds permitted time during the monitored period, the client component 26 will notify the user and request that the user terminate the browser 36. If the user fails to terminate the browser 36, then a violation will be reported to the web server 30 and an email notification will be sent to a supervisor. Likewise, if the current time period changes from monitored to restricted, then the user is notified.

The user display application 46 provides a periodically updated visual display to the user. This display includes the amount of authorized time a user has remaining on the Internet and the period of use (restricted/unrestricted). The timer 44 considers the time the browser 36 is minimized to be inactive time. The client-based module 26 knows when the browser 36 is minimized by utilizing the following methodology: upon startup a reference (or handle) to the main browser window is obtained and stored in memory by the client module. At regular intervals this reference handle is queried for its current state (by using the "IsIconico( )" OS API) in order to determine if the window has been minimized or not. In an alternative embodiment, the timekeeping function of this invention allows for calender functions, including on-the-job timekeeping for remote employee users.

The temporary log cache 48 stores the time stamped URL requests sent from the timer application. Also, the temporary log cache 48 stores the gateway web site. The gateway web site is the web site the user is directed to after authentication. The gateway web site can either be determined by the subscriber (employer) or through commercial arrangements with various companies interested in becoming a point of entry for users. This can be established by creating a brief user profile upon user registration. The user can then be introduced to a number of sites which are of particular interest to their profession or group. This entry point is similar to the home page concept, with the exception that it cannot be changed by the user.

Figure 5:
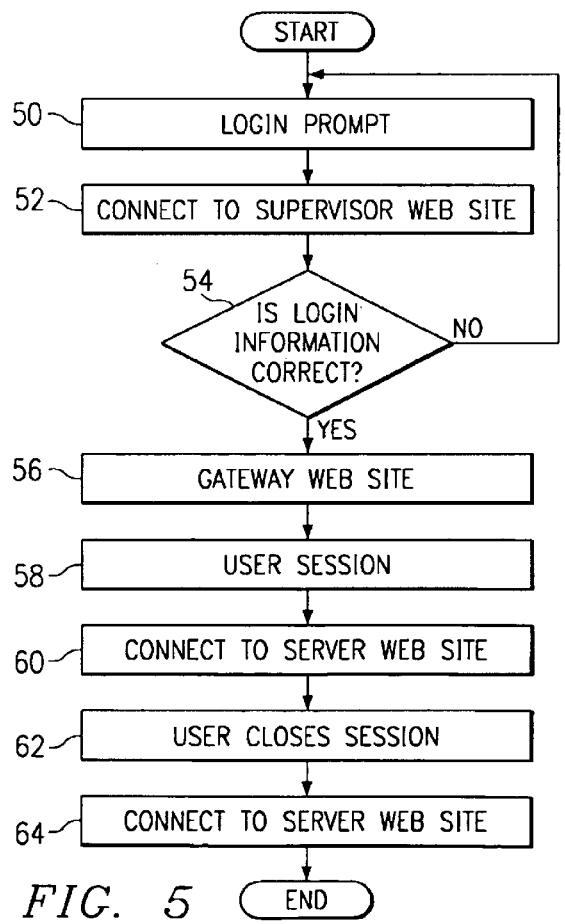
FIG. 5 is a flow chart illustrating a method of the present invention for handling a user session.

Referring to FIG. 5, a user begins an Internet session by opening his Internet browser. The "browser helper object" model offered by Internet Explorer allows the client component to load up whenever the browser starts. At step 50, a user authentication module presents the user with a log-in prompt. The user is asked to enter his user name and password.

At step 52, the Internet browser 36 automatically connects to the supervisor web site 30. At step 54, the client component transmits the authentication information for verification to the web site using the same protocol used by the browser (i.e., an HTTP or HTTPS POST operation). The web site server 32 indicates success or failure.

In the case of authentication failure, the user is permitted to either retry, exit the browser 36 or ignore the authentication in which case the client component 26 notifies the web site server 30 of the violation. The web site server 30 saves this information in the database and may send out an e-mail to the administrator. The present invention allows for continued Internet access even in the event of a server failure.

In the case of authentication success case, the web server 30 returns the following information and guidelines: (i) number of permitted minutes/week; (ii) number of minutes already consumed this week; (iii) the monitored and restricted start and end times; and (iv) the current system time at the server. In the preferred embodiment, the server returns a gateway web site.

The user display application of the client component notifies the user about the remaining time as well as the current period (Monitored, Restricted or Unrestricted) and then starts a visible timer on the client machine. This timer is used to track the time spent on every web page visited by the user.

At step 56, the user is presented with a gateway web site. At step 58, a user Internet session begins. The user may go to any URL. Each time the user navigates to a new web page, the previous web page title, location (Universal Resource Locator or URL), and time spent are then stored by the client component 26 in memory on the client computer. The web page title and URL are obtained from system notifications from the browser to the client component 26.

Periodically, at step 60, the client monitoring module 26 reconnects to the server web site. Upon reaching preset limits (such as number of records, time elapsed, etc.) or on termination of the browser process, the client component 26 will transmit this cached information to the web site server 30. The latter will store this information in a database under the appropriate user's history log.

At step 62, the user ends the Internet session by closing his web browser. At step 64, the client monitoring module 26 connects to the supervisor web site 30. The supervisor web site authenticates the log-in information and the client monitoring module 26 uploads the temporary history log cache. The user Internet session is completed.

If the user exceeds his permitted time during the monitored period, then the client component 26 will notify the user and request that the browser 36 be terminated. If the user fails to do so, then the violation is reported as before. Likewise, if the current time period changes from Monitored to Restricted, then again the user is notified as before.

Figure 4:
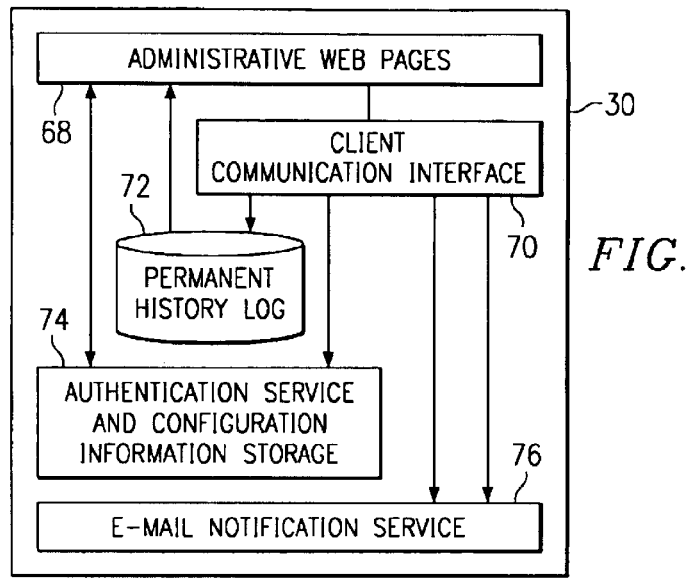
FIG. 4 is a block diagram illustrating a web-side supervisor server.

B. User and Administrative Sessions with Respect the Web-Based Supervisor Module The operation of the web-based supervisor module will not be described in detail. The system allows administrators and users to log-in to the web-based supervisor server and read reports on Internet usage. The reports of the supervisors are much more detailed. Referring to FIG. 4, the web-based supervisor 30 includes an administrative web pages application 68, a client communication interface 70, a permanent history log 72, an authentication service and configuration information storage application 74, and an email notification service application 76.

The administrative web pages application 68 processes and presents all web-page requests which the server receives. The client communication interface 70 receives and processes requests from the client-based module 70.

The permanent history log records the information from the client-based temporary history cache 48. This information is viewable by an administrator in either a summary format (total number of hours spent by each user) or in a detailed format (time per web page with details like the web page tile, URL, and time) by visiting the web site and entering the Administrator authentication information. This function is the same as that of a history log of Internet Explorer, Netscape Navigator, or Netscape Communicator except that a web-based format does not permit modification by the client machine.

The supervisor web site authenticates the log-in information and the client monitoring module uploads the temporary history log cache 48 to the server web site 30. The client communication interface accepts the temporary history log cache and sends it to a permanent history log 72.

Figure 6:
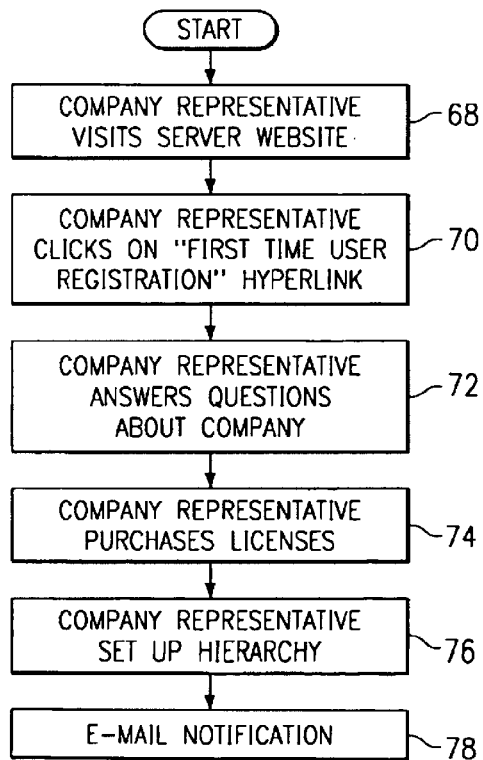
FIG. 6 is a flow chart illustrating a method of the present invention for handling the acquisition of the Internet monitoring system; and, FIG. 7 is a bit map screen shot illustrating a preferred user interface or "wizard" dialog for configuring first-time user registration.
Figure 7:
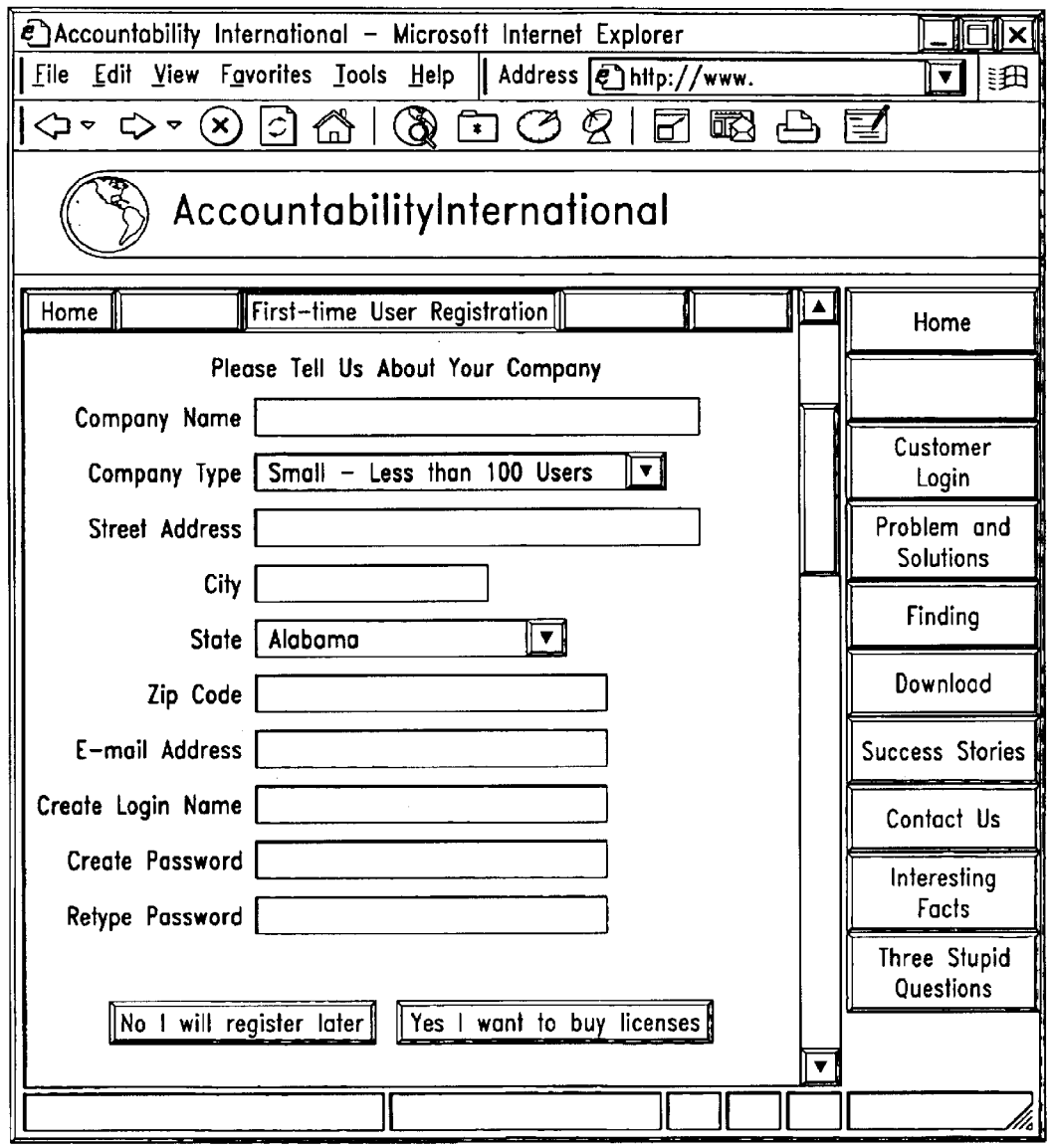

Referring to FIG. 6, a company representative acquires the Internet monitoring system. At step 74, the company representative visits the server web site and decides to register his company for the Internet monitoring system. At step 76, the company representative clicks on "first time user registration" hyperlink. At step 78, the company representative answers questions about his company. These questions include company name, address, and the like. Referring to FIG. 7, a First-Time User Registration interface is shown.

Referring again to FIG. 6, At step 80, the company representative decides how many licenses to purchase. At step 82, the company representative sets up the company hierarchy. In order to effectively manage Internet access, a system should support existing organizational structures. A department supervisor, for example, should be able to determine the needs of his subordinates within a safe overall framework. This is important for the overall success of Internet access within the organization as it allows supervisors to address any problems which arise early on (before they become serious personnel issues).

Accordingly, the Internet access monitoring system of the present invention supports a hierarchical structure where individual supervisors can monitor and set the access rules for their individual workgroups without affecting others in the organization. At the same time, a central authority (e.g., corporate IS department) still can establish general rules that cannot be overwritten on the workgroup level.

The company representative proceeds to configure groups of users. Each group may be assigned times during the day when users belonging to that group may be restricted from accessing the Internet and other times during which they may be permitted monitored access to the Internet. During a monitored period, all Internet access is logged and timed. Other times of the day are considered to be unrestricted periods during which Internet access is not monitored.

The company representative then proceeds to set up individual users belonging to these groups by inputting names, e-mail addresses and authentication information for each user.

At step 84, the web site sends an e-mail to each new user with information about downloading and installing the client-side software component required for client-based monitoring.

III. Examples

Three examples demonstrate the effectiveness of this system. Consider, for instance, employee Ralph who begins routinely accessing pornographic sites on the Internet during business hours. Ralph's activities are prohibited by company policy, and are taking up vital bandwidth. Using current technology, the company's IS department would likely not detect the activity for weeks, or even months, as the department's main focus is to keep the company's networks running smoothly, not to track individual activities. At the point when the activity is uncovered, Ralph might have already violated company policy to the point where his manager has no choice but to dismiss Ralph. If Ralph's Internet access activity is monitored locally by Ralph's supervisor, however, the supervisor can notice the prohibited activity almost immediately. After reminding Ralph of company policy, the supervisor can continue to monitor Ralph's on-line activities and head off the need to terminate Ralph.

As another example, consider Donna's company, a small company that cannot afford an expensive server and the technical expertise to support the server. Donna wants to monitor her employees' Internet access, but can not afford a conventional Internet monitoring system requiring a LAN server and technical expertise. However, Donna can afford the Internet access monitoring system of the present invention since it does not require a local server or technical expertise.

As another example, consider Tommy, an employee who normally has very little Internet access but needs to write a competitive analysis for a new product. To complete this task effectively, Tommy requires Internet access for performing required research. Conventionally, Tommy's supervisor would call the company's IS department to arrange the appropriate Internet access, a process requiring days or even weeks. However using the Internet access monitoring system of the present invention, Tommy accesses the Internet as required to finish his project and the Administrator does not act on the warning e-mail.

Although the invention has been described with reference to certain exemplary arrangements, it is to be understood that the forms of the invention shown and described are to be treated as preferred embodiments. Various changes, substitutions and modifications can be realized without departing from the spirit and scope of the invention as defined by the appended claims.

What is claimed is:

1. A method for monitoring the Internet access of a computer, the method comprising:

providing at the computer a client-based monitoring module;

providing at a web server a web-based supervisor module that specifies guidelines which govern Internet access by the computer, sending the guidelines from the supervisor module to the client-based monitoring module;

at the client-based monitoring module, logging a request for Internet access in a log, and logging any violations of the guidelines in the log;

displaying at the computer an amount of Internet access time a user of the computer has remaining; and sending the log to the supervisor module where the following sub-steps are performed:
(1) copying the log into a web-based log; and
(2) notifying a designated administrator of any violation.

2. The method as recited in claim 1, wherein the operation of providing at the computer a client-based monitoring module further comprises providing the computer that includes a device selected from the group consisting of a personal computer, a wireless telephone, and a computerized appliance.

3. The method as recited in claim 1, wherein the operation of providing at a web server a web-based supervisor module further comprises specifying guidelines relative to interactive usage of the Internet by a user of the computer.

4. The method as recited in claim 1, wherein the operation of providing at a web server a web-based supervisor module further comprises specifying guidelines relative to the times at which a user of the computer can interactively use the Internet.

5. The method as recited in claim 1, further comprising the operation of activating a browser and triggering the client-based monitoring module.

6. The method as recited in claim 1, wherein the operation of logging a request for Internet access in a log further comprises intercepting a universal resource link request between a browser and a network programming interface.

7. A system for monitoring network access, comprising:
a computer operable to connect to the network;
a monitoring module associated with the computer, the monitoring module operable to create a database containing a history log relative to access of the network;
a display associated with the monitoring module, the display operable to indicate an amount of authorized time a user of the computer has remaining on the network; and
a supervisor module provided at a server which is in periodic communication with the computer, the supervisor module including a web-based log operable to store the history log,
wherein the monitor module is operable to transfer the history log from the computer system to the supervisor module.

8. The system as recited in claim 7, wherein the network is the Internet.

9. The system as recited in claim 7, wherein the computer comprises a device selected from the group consisting of a personal computer, a wireless telephone, and a computerized appliance.

10. The system as recited in claim 7, wherein the monitoring module is operable to monitor interactive usage of the network by a user of the computer.

11. The system as recited in claim 7, wherein the monitoring module is operable to monitor the times at which a user of the computer can be connected to the network.

12. The system as recited in claim 7, wherein the monitoring module is operable to monitor destinations on the network.

13. The system as recited in claim 7, wherein the monitoring module is operable to search the computer for certain file names.

14. The system as recited in claim 7, wherein the monitoring module is triggered by the activation of an Internet browser.

15. The system as recited in claim 14, wherein the monitoring module considers the time the Internet browser is minimized to be inactive time.

16. The system as recited in claim 7, wherein the display indicates a period of network use.

17. The system as recited in claim 7, wherein the display indicates a period of network use selected from the group consisting of monitored, restricted, and unrestricted.

18. The system as recited in claim 7, further comprising a plurality of computers operable to connect to the network, each of the plurality of computers including respective monitoring modules.

19. A method for monitoring the network access of a computer, the method comprising:
specifying guidelines which govern network access by the computer;
storing the guidelines at the computer;
displaying at the computer an amount of authorized network access time a user of the computer has remaining;
monitoring a request for network access at the computer;
responsive to a violation of the specified guidelines caused by the request for network access, logging the violation in a log stored at the computer;
providing an indication of the violation to a user of the computer; and
permitting the request for network access.

20. The method as recited in claim 19, wherein the operation of specifying guidelines which govern network access by the computer further comprises specifying guidelines which govern Internet access.

21. The method as recited in claim 19, wherein the operation of specifying guidelines which govern network access by the computer further comprises specifying guidelines relative to the computer which comprises a device selected from the group consisting of personal computers, wireless telephones, and computerized appliances.

22. The method as recited in claim 19, further comprising the operation of sending the log to a supervisor module associated with a web server where the following sub-steps are performed:
(1) copying the log into a web-based log; and
(2) notifying a designated administrator of the violation.

23. The method as recited in claim 19, wherein the operation of specifying guidelines further comprises specifying guidelines relative to interactive usage of the network by a user of the network.

24. The method as recited in claim 19, wherein the operation of specifying guidelines further comprises specifying guidelines relative to the times at which a user of the computer can interactively use the network.

25. The method as recited in claim 19, wherein the operation of logging a request for network access in a log further comprises the operation of detecting the activation of a browser.

26. The method as recited in claim 19, wherein the operation of logging a request for network access in a log further comprises intercepting a universal resource link request between a browser and a network programming interface.

27. A method for monitoring the network access of a computer, the method comprising:
specifying guidelines which govern network access by the computer;

storing the guidelines at the computer;

displaying an amount of authorized time a user of the computer has remaining on the network; and at the computer, logging a request for network access in a log and logging any violations of the guidelines in the log.

28. The method as recited in claim 27, wherein the operation of specifying guidelines which govern network access by the computer further comprises specifying guidelines which govern Internet access.

29. The method as recited in claim 27, wherein the operation of specifying guidelines which govern network access by the computer further comprises specifying guidelines which govern network access by a device selected from the group consisting of a personal computer, a wireless telephone, and a computerized appliance.

30. The method as recited in claim 27, further comprising the operation of sending the log to a supervisor module associated with a web server where the following sub-steps are performed:

(1) copying the log into a web-based log; and (2) notifying a designated administrator of the a violation.

31. The method as recited in claim 27, wherein the operation of specifying guidelines further comprises specifying guidelines relative to interactive usage of the network by a user.

32. The method as recited in claim 27, wherein the operation of specifying guidelines further comprises specifying guidelines relative to the times at which a user of the computer can interactively use the network.

33. The method as recited in claim 27, wherein the operation of logging a request for network access in a log further comprises the operation of detecting the activation of a browser.

34. The method as recited in claim 27, wherein the operation of logging a request for network access in a log further comprises intercepting a universal resource link request between a browser and a network programming interface.

35. The method as recited in claim 27, wherein the operation of displaying the amount of authorized time a user of the computer has remaining on the network further comprises displaying a time selected from the group consisting of number of permitted minutes/week, number of minutes already consumed/week, monitored and restricted start and end times, and current system time at the computer.

36. The method as recited in claim 27, wherein the operation of displaying the amount of authorized time a user of the computer has remaining on the network further comprises indicating a period of use selected from the group consisting of monitored, restricted, and unrestricted.

37. A system for monitoring the Internet access of a computer, the system comprising:

means for specifying guidelines which govern Internet access by the computer;

means for storing the guidelines at the computer;

at the computer, means for displaying an amount of authorized time a user of the computer has remaining on the Internet;

at the computer, means for logging a request for Internet access in a log and logging any violations of the guidelines in the log; and means for sending the log to a supervisor module associated with a server wherein the log is copied to a web-based log.

38. The system as recited in claim 37, further comprising responsive to any violation of the guidelines, means for notifying a designated administrator of any violation.

39. The system as recited in claim 37, wherein means for displaying further comprises means for displaying a time selected from the group consisting of number of permitted minutes/week, number of minutes already consumed/week, monitored and restricted start and end times, and current system time at the computer.

40. The system as recited in claim 37, wherein means for specifying guidelines further comprises means for specifying guidelines relative to the total time a user of the computer can be connected to the Internet.

41. The system as recited in claim 37, wherein means for specifying guidelines further comprises means for specifying guidelines relative to the times at which a user of the computer can interactively use the Internet.

42. The system as recited in claim 37, wherein means for logging a request for Internet access in a log further comprises means for detecting the activation of a browser.

43. The system as recited in claim 37, wherein means for logging a request for Internet access in a log further comprises means for intercepting a universal resource link request between a browser and a network programming interface.

* * * * *